United States Patent [19]

Wareham et al.

[11] 4,100,559
[45] Jul. 11, 1978

[54] APPARATUS FOR PACKAGING AND FOR USING SELF-DEVELOPING PHOTOGRAPHIC FILM

[75] Inventors: Richard R. Wareham, Marblehead; Nicholas Gold, Arlington, both of Mass.

[73] Assignee: Polaroid Corporation, Cambridge, Mass.

[21] Appl. No.: 756,266

[22] Filed: Jan. 3, 1977

[51] Int. Cl.² .............................................. G03B 17/26
[52] U.S. Cl. .................................. 354/277; 354/275; 354/178; 354/83; 96/201
[58] Field of Search .................. 354/83, 84, 85, 86, 354/174, 177, 178, 179, 275, 276, 277; 96/76 C, 201

[56] References Cited

U.S. PATENT DOCUMENTS

| | | | |
|---|---|---|---|
| 3,582,335 | 6/1971 | Erlichman | 354/174 |
| 3,651,746 | 3/1972 | Land | 354/83 |
| 3,761,271 | 9/1973 | Rogers | 96/76 C |
| 3,765,887 | 10/1973 | Rogers | 96/76 C |
| 3,779,770 | 12/1973 | Alston et al. | 96/76 C |

*Primary Examiner*—L. T. Hix
*Assistant Examiner*—Alan Mathews
*Attorney, Agent, or Firm*—Edward S. Roman

[57] ABSTRACT

A photographic film cassette having a stack of self-contained, self-developing film units includes leaders interconnecting the units to enable them to be withdrawn from the cassette one at a time. A Z-fold or zig-zag configuration of the film units and leaders is employed, with a leader interconnecting the leading edge of one film unit and the trailing edge of the preceding film unit. The cassette structure cooperates with the connection of the leader to the film unit leading edge to project a film unit against a cassette wall to prevent inadvertent withdrawal of the unit. Staggered loading, and alternatively symmetrical back-to-back loading of the film units in the cassette, can increase the number of film units the cassette accommodates in a limited space.

12 Claims, 10 Drawing Figures

APPARATUS FOR PACKAGING AND FOR USING SELF-DEVELOPING PHOTOGRAPHIC FILM

BACKGROUND OF THE INVENTION

This invention relates to apparatus for packaging and for using self-developing photographic film and, in particular cassettes of self-contained self-developing film units.

Self-developing cameras, which position, expose and effect development of photographic film, have been used by industry and the consuming public for many years. The earliest cameras use roll film in which a photosensitive sheet is exposed and brought together with a contact sheet carrying a rupturable container of a fluid photoprocessing composition. The sheets pass through aligned rollers to rupture the container and spread the photoprocessing composition between the sheets. After development with the photoprocessing composition, the user peels the two sheets apart.

Later self-developing cameras use cassettes having a set of photosensitive sheets and an equal number of insensitive sheets. Two sheets, one from each set, again are brought into contact after exposure. After passing through spread rolls and development, the sheets are peeled apart.

Recently, cassettes of self-developing units of film have been introduced in which each film unit is totally self contained. The film unit is denoted as being "self contained" because, in contrast to the prior "put together" and "peel apart" film noted above, the initial laminar configuration of each film unit remains intact throughout exposure, processing and ultimate use of the photographic product. The laminar film unit structure thus is not changed, either by bringing sheets together or by peeling sheets apart. U.S. Pat. Nos. 3,415,644; 3,651,746; and 3,779,770 disclose a form of self-contained film unit which is exposed from the same side on which the photographic product is viewed, and disclose containers for packaging them. U.S. Pat. Nos. 3,761,271 and 3,765,887 describe self-contained film units which are exposed and viewed from opposite sides, and describe containers for holding them.

The self-contained film units provide multiple user advantages, including freedom from having to bring two sheets together, from having to time the development interval, and from having to peel film sheets apart. However, the new film units have been capable of use only in correspondingly designed cameras, and not in prior cameras designed for use with the cassette-packaged "peel-apart" types of self-developing film.

Others have suggested ways of using self-contained self-developing film units in the older cameras, but their constructions have not been adapted commercially. See, for example, the above-noted U.S. Pat. Nos. 3,765,887 and 3,761,271.

It is, therefore, an object of this invention to provide a photographic film cassette of self-contained self-developing film units for use in older cassette-loading cameras which have hitherto been unable to employ the new self-contained type of film. Other objects of the invention include providing such a cassette of self-contained film units which can be used in an older, cassette-loading camera without modification to the film-handling portion of the camera, which provides generally the same number of exposures as the multiple sheet cassette for which the camera was designed, and which is simple to load and use. It is also an object of the invention that the cassette of self-contained film units operate with high reliability, particularly in a camera which relies entirely on manual transport for the film advancing and processing operations.

Another object of the invention is to provide a means for transporting self-contained units of self-developing film in a camera designed for cassette-loaded peel-apart film.

Other objects of the invention will in part be obvious and will in part appear hereinafter.

SUMMARY OF THE INVENTION

The invention features a photographic film cassette having self-contained film units stacked in a casing behind an opaque dark slide. The cassette casing has a special discharge structure and the film units are interconnected in a novel manner that enables an exposed film unit to be extracted from the casing through the processing-initiating spread rolls of the camera, and that leaves all the other film units within the casing, with the next one in position for exposure.

The casing has an exposure window in one wall and a discharge slot at one end, as is generally conventional. Each film unit in the cassette, which can employ a construction disclosed in the above-noted patents, has at least two layers and a rupturable container of fluid photoprocessing composition. The layers provide a sealed volume which receives the photoprocessing composition when the container is ruptured. The dark slide in the cassette has a withdrawal tab which passes through the casing exit slot and is accessible when the cassette is loaded into a camera.

The structure which interconnects the film units includes a leader connected to the leading edge portion of each film unit. The leader of the foremost film unit, which is located immediately behind the dark slide, is connected to the dark slide in a releasable manner such that the dark slide and the leader follow different paths out of the camera when the dark slide is withdrawn. The leader of each successive film unit in the cassette is connected to the preceding film unit, again in a manner that provides a frangible link.

The discharge slot in the casing has a width sufficient to pass the maximum thickness of a film unit, which is the thickness at the rupturable container. The slot however is too narrow to allow withdrawal of two film units simultaneously. Moreover, each leader is connected to the leading edge of its associated film unit, and threads out of the cassette, in a manner that interferingly projects the film unit edge against a barrier portion of the cassette casing. This selective interference, together with the frangible interconnections which the leaders provide, allows an exposed film unit to be withdrawn readily but restricts the successive withdrawal of a further film unit, i.e. restricts the withdrawal of an unexposed film unit when the preceding exposed unit is withdrawn. These structural features thus ensure that manual withdrawal of an exposed film unit by way of its leader withdraws that unit completely through the processing rolls and from the camera, and yet does not dislodge the next film unit, which is unexposed, from the cassette.

In a preferred embodiment, the invention features a photographic film cassette having a relatively small height and in which the film units are stacked in a staggered relation. Alternatively, the units are arranged in two sets which the cassette houses back-to-back. After one set of film units has been used, the user opens the camera and manually reverses the cassette to position the second set of film units for exposure and processing.

The invention thus provides a photographic film cassette which can be used with prior cameras designed for film cassettes having sheets which are separate prior and/or subsequent to development.

The invention also features a means for effecting exposure and development of successive self-contained units of self-developing film housed in the cassette. After the cassette is loaded into the camera and the camera closed, the dark slide is removed through a first camera aperture. This motion of the dark slide feeds a first leader, connected to a leading edge of the foremost film unit, through the camera spread rolls and out through a second camera aperture, i.e. the aperture provided for the discharge of exposed film units. Further withdrawal of the dark slide to extract it fully from the camera detaches it from the first leader, which remains accessible outside the camera at the film discharge opening. The first film unit is then available and positioned for exposure.

After exposure, pulling on the exposed leader dislodges the exposed film unit from the cassette and pulls it through the processing rolls. As is known, this operation ruptures the container of photoprocessing fluid and spreads it within the film unit to initiate processing of the latent image. Continued withdrawal of the leader pulls the film unit from the camera.

This continued film transport also introduces the leader of the next film unit through the spread rollers and out the film discharge opening of the camera. However, the engagement of the leading edge of the second, unexposed film unit with a barrier portion of the casing retards dislodgement of that film unit from the cassette. The retarding engagement is sufficient to break the frangible connection between the accessible leader of the second film unit and the preceding film unit, which has been removed from the camera. Thus the exposed film unit outside the camera is entirely separate from the remaining film units within the camera-housed cassette. Correspondingly, the second film unit is in position and ready for exposure. After exposure, it is transported from the cassette by manual engagement of the accessible leader, in the same manner as the preceding film unit. This process continues until all the successively-stacked film units in the cassette are exposed and processed.

DESCRIPTION OF THE DRAWINGS

Other features, advantages and objects of the invention will appear from the following description of preferred embodiments, taken together with the drawings in which.

DESCRIPTION OF ILLUSTRATED EMBODIMENTS

Figure 1:
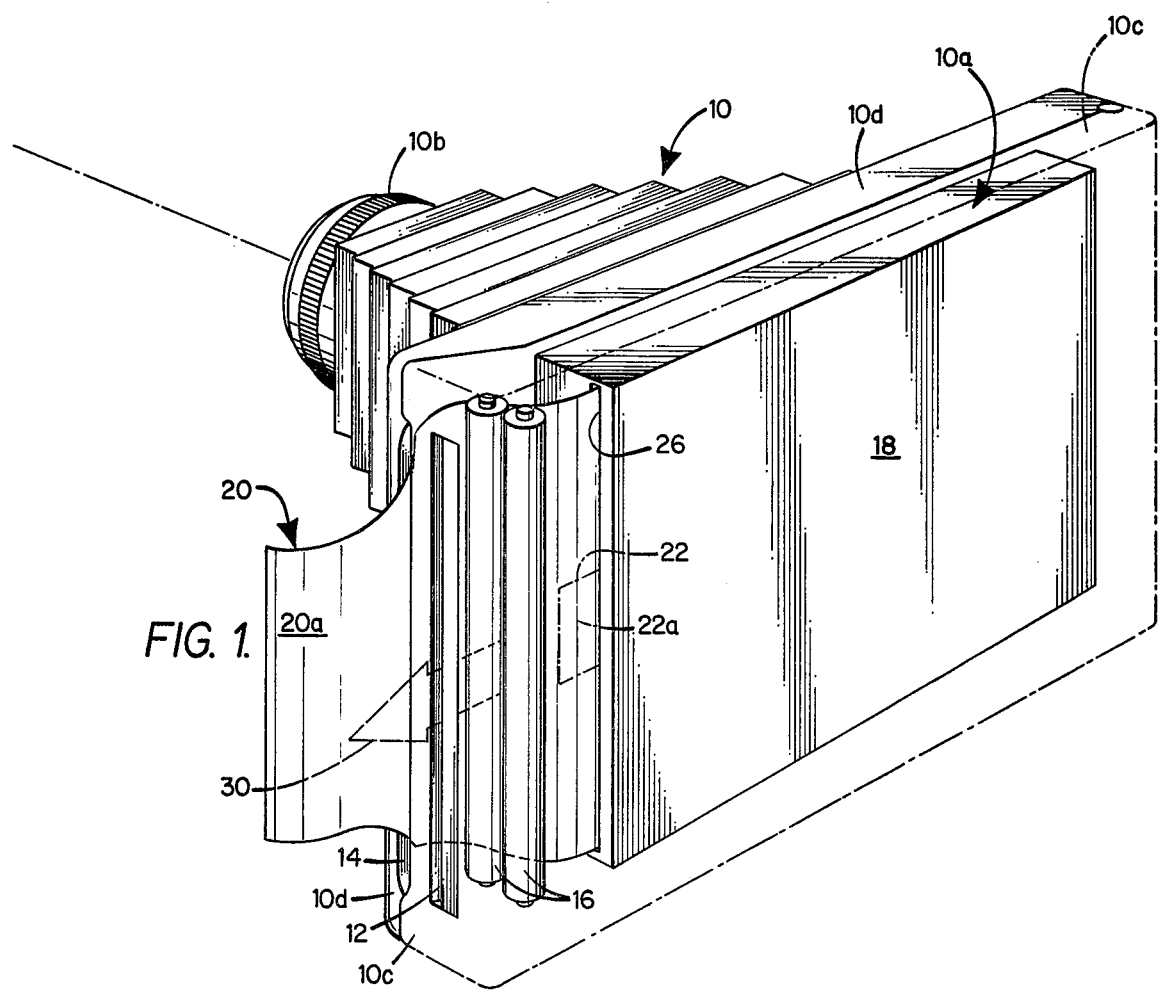
FIG. 1 is a perspective view of a film cassette according to the invention positioned in a camera designed for a prior type of self-developing cassette film.

Referring to FIG. 1, a prior camera 10 typical of those designed to use cassettes of self-developing film employing separate sheets has an internal compartment 10a for receiving the film cassette and has two discharge openings 12 and 14. The former opening is in line along a film path with the film discharge slot of the cassette and with the nip between two spread rolls 16 of the camera. The other opening 14 is offset from the film path as shown and is designed to receive the tab portion of the cassette dark slide. In one specific prior camera, this opening 14 also receives the set of tabs (not shown) with which the user indexes each film, after it is exposed, along the film path. The body of camera 10 has a hingedly mounted back cover 10c, shown closed, which opens to provide access to the compartment 10a, and the illustrated opening 14 is between this cover and the other portion 10d of the camera body.

In one prior art operation, after loading a fresh cassette, the user removes the dark slide through the opening 14, exposes the foremost film through the camera lens 10b (which is in optical alignment with an image plane in the compartment 10a), and withdraws a tab appearing at the opening 14. This movement indexes the exposed film to project a frontal tab through the opening 12. The user draws the exposed film along the film path by engagement with the projecting film tab. This transport brings two separate sheets within the cassette together and through the spread rolls. The rolls spread a fluid photoprocessing composition from within a rupturable pod and evenly across a photosensitive surface of the sheets. Continued film transport draws the laminate of the two sheets from the camera. After a specified development time, the user peels the two sheets apart to provide a developed photograph. The Polaroid Corporation Model 250 Land Camera is one example of the camera having the foregoing structure and operation, and Polaroid Corporation film packs type 107 and type 108 are examples of peel-apart film with which the camera operates in this manner.

Figure 2:
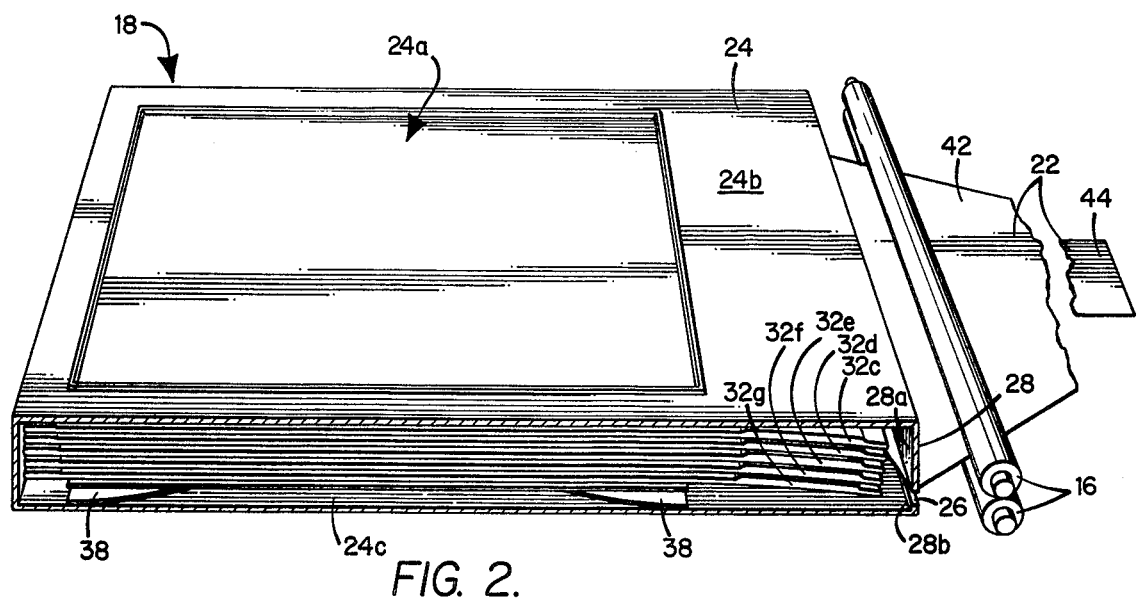
FIG. 2 is a perspective view, partially cut away, of a film cassette according to the invention in operable position relative to camera spread rolls.

With reference to FIGS. 1 and 2, this invention provides a cassette 18 of self-contained units of self-developing film which fits into the camera compartment 10a interchangeably with the original "peel-apart" cassette. The new cassette thus makes the self-contained film units available for use in the prior cameras. When first loaded into the camera as in FIG. 1, a removal tab 20a of a dark slide 20 in the cassette 18 projects through the camera opening 14 in essentially the same manner as described above with reference to the prior cassette for which the camera was designed. However, in contrast to the prior practice, the new cassette 18 has no further tabs or structure which pass through the opening 14. Instead, not only the self-contained film units of the cassette 18, but also interconnecting leaders 22 feed out from the cassette along the film path and hence through the nip between the spread rolls and out the film discharge opening 12. FIG. 2, which shows the cassette 18 after removal of the dark slide and the first two film units, shows a leader 22 in this position.

The new cassette 18 of self-contained film units has a casing 24 having essentially the same external dimensions as the prior cassette which it replaces, and having an exposure window 24a in a casing front wall 24b. A film discharge slot 26 is in the casing sidewall 28 which faces the spread rolls when the cassette is installed, as shown. The discharge slot is aligned along the film path 30 and is spaced significantly closer to the casing back wall 24c than to the front wall 24b.

Within the cassette casing 24 directly below and spanning across the exposure window 24a is the opaque dark slide 20. The dark slide, which typically lies under the entire span of the casing front wall 24b, shields the film units within the cassette from actinic light at the exposure window 24a. The removal tab 20a of the dark slide extends out of the cassette discharge slot 26 and, when the cassette is loaded in the camera as in FIG. 1, departs from the film path 30 to by-pass the press rolls 16 and pass through the camera opening 14.

Stacked within the cassette casing between the dark slide 20 and the casing back wall 24c are several self-contained units 32 of self-developing film. Each film unit 32 is of the self-contained type disclosed in the above-noted U.S. Pat. Nos. 3,761,271 and 3,765,887, for the camera 10 exposes film with no image reversals. The invention can, however, be practiced with other self-contained film units, such as are noted above. Each film unit is a laminated card-like structure having a rupturable pod 34 of fluid photoprocessing composition adjacent the leading marginal edge, which in the cassette 18 is proximal to the discharge slot 26, and a trailing edge 36 between which is disposed an image receiving area 21 of the same given length as the exposure window 24a. The film cassette 18 also includes a spring element 38 nested between the film units 32 and the casing back wall 24c. The spring exerts a resilient force which urges the film units and the dark slide toward the casing front wall 24b. The illustrated preferred spring has a leaf-type structure disclosed in the above-noted U.S. Pat. No. 3,779,770.

Figure 3:
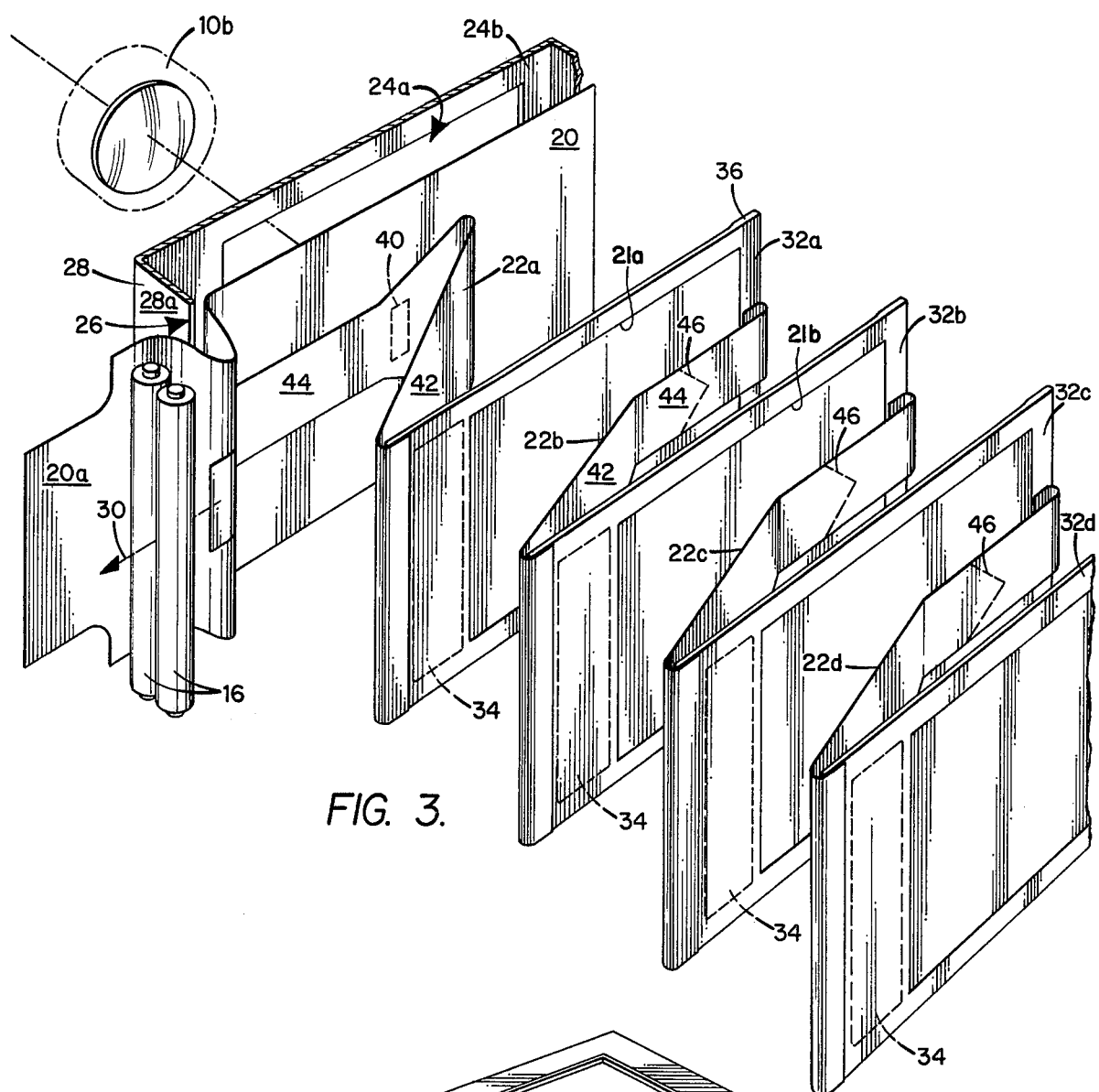
FIG. 3 is an exploded fragmentary view of interconnected film units and a dark slide of a film cassette according to the invention, and operably positioned relative to camera spread rolls.

To enable the self-contained film units 32 to be drawn from the cassette 18 and along the camera film path 30, without retrofitting the camera, the film units and dark slide are interconnected in a Z-fold or zig-zag configuration shown for clarity in exploded form in FIG. 3. The interconnecting structure includes a frangible sheet-like leader 22b, 22c, 22d . . . interconnecting the leading edge of each film unit 32b, 32c, 32d . . . with the trailing edge of the preceding unit 32a, 32b, 32c . . . in the cassette. The leader 22a associated with the foremost film unit 32a connects to the dark slide 20 at a location 40. Each illustrated leader has a base portion 42 of substantially the same width as the film unit to which it connects and tapers gradually to a neck portion 44 that connects to the preceding film unit. A perforation 46, preferably of V-shape and following the contour of the taper as shown to minimize off-center pull on the leader, weakens each leader neck portion. This illustrated leader construction is one preferred form that provides a relatively strong portion attached to the leading edge of each film unit and an easily-threaded less-strong portion joining to the trailing edge of the preceding film unit.

As also shown, the illustrated film structure has the base portion of each leader 22 connected to the leading edge of the associated film unit 32 on the side of the unit facing the spring 38; this is the side of the film unit which is directed away from the exposure window. This attachment of each leader to the non-imaged side of a film unit combines with structure of the cassette casing to allow an exposed film unit to be transported along the film path without dislodging remaining units from the cassette. The neck portion of each illustrated leader is connected to the trailing edge of the preceding film unit 32 also at the side directed away from the exposure window.

With further reference to FIG. 3, the illustrated first leader 22a has the same configuration as the outer leaders but has no perforation. Instead, it is secured to the dark slide 20 with an adhesive that releases at relatively low tension, well before the leader tears, even at the narrow neck portion. The attachment is confined to a relatively small location 40 which is well spaced from the leading edge, i.e. from the free end of the leader neck portion 44. In the illustrated embodiment, the releasable attachment is located adjacent the juncture of the leader tapered portion with the neck portion. This leaves the neck portion of the foremost leader 22a freely extending from the attachment location 40 to its free end. Further, intermediate the attachment location 40 and the attachment to the foremost film unit 32a, the leader 22a is folded in such a manner that the neck portion extends from the attachment location 40 toward the forward side of the cassette 18, i.e. toward and through the film exit slot 26. The leader free end accordingly is directed toward the spread rolls 16 when the cassette is loaded in a camera.

The leaders typically are of paper and are attached to the film units with an adhesive. The adhesive preferably is of a type that allows the leader structure to be peeled from the finally-processed film unit without leaving any mark or residue.

FIG. 3 further shows that the set of film units 32 stacked in the cassette 18 (FIG. 2) for exposure through the casing window 24a are all oriented with the photosensitive surfaces facing the exposure window and hence the camera lens 10b. The leading edges, which carry the composition pods 34, are at the forward side of the cassette, which is where the discharge slot 26 is located. The leaders 22 interconnecting the set of film units thus extend like diagonals from the leading edge of one film unit across the stack to the trailing edge of the preceding unit. Where the film units are of the type which is viewed from the side opposite the exposed side, as illustrated, the leaders attached to the margin of the film units, outside the area of the photographic frame.

By way of illustrative example and not limitation, one embodiment of the invention for use with a film unit having an overall dimension of 10.8 centimeters length and 8.9 centimeters width, has a leader of the same length as the film unit, i.e. 10.8 centimeters, of which approximately 6 centimeters is tapered from the full width of the unit to the neck, which is approximately 2.7 centimeters wide and extends for the balance of the leader length, i.e. 4.8 centimeters. The foregoing dimensions are for the leader structure which extends between two film units, and does not include the leader structure that overlaps and is adhered to the film units. The foregoing dimensions are also applicable to the first leader

22a, and it has the releasable adhesive location 40 at about 4 to 5 centimeters from the leader free end.

The foregoing leader-interconnected film units 32 cooperate with structure of the casing 24 to ensure that only the foremost film unit 32, i.e. the one positioned directly below the exposure window, and hence ready for exposure, is withdrawn from the casing. The casing structure in point is, with reference to FIG. 2, the casing forward side wall 28. More particularly, the discharge slot 26 is located in the wall 28 well spaced from the casing front wall 24b which contains the exposure window. The portion of end wall 28 between the front wall 24b and the slot 26 accordingly has significant width, and forms a film hold back panel 28a. The portion of end wall 28 on the other side of slot 26 from the panel 28a has sufficient width to form a hold back lip 28b. The width of the slot is sufficient to pass the maximum thickness of a film unit 32, which is the thickness at the pod 34, without significant interference, and preferably with bare clearance. A wider slot is generally not used, for it is subject to inadvertent discharge of two film units simultaneously.

The method of using the cassette 18 of self-contained film units in the camera of FIG. 1, and the operation of the cassette structure, are described with reference first to FIGS. 1 and 3, which show the cassette 18 just after loading into the camera film compartment 10a. The dark slide removal tab 20a extends out from the cassette 18 through the discharge slot 26 for a sufficient distance to project outward from the camera opening 14. Further, the free end of the first leader 22a projects out from the cassette slot 26. This initial projection of the first leader is relatively short, but of sufficient length to ensure that it is outside the cassette. The free end of the first leader is not attached to the dark slide and hence does not follow the folded contour to which the dark slide tab 20a is constrained. Rather, the free end of the leader 22a assumes a natural configuration substantially straight out from the cassette casing and along the film path 30 toward the spread rolls 16.

Figure 4:
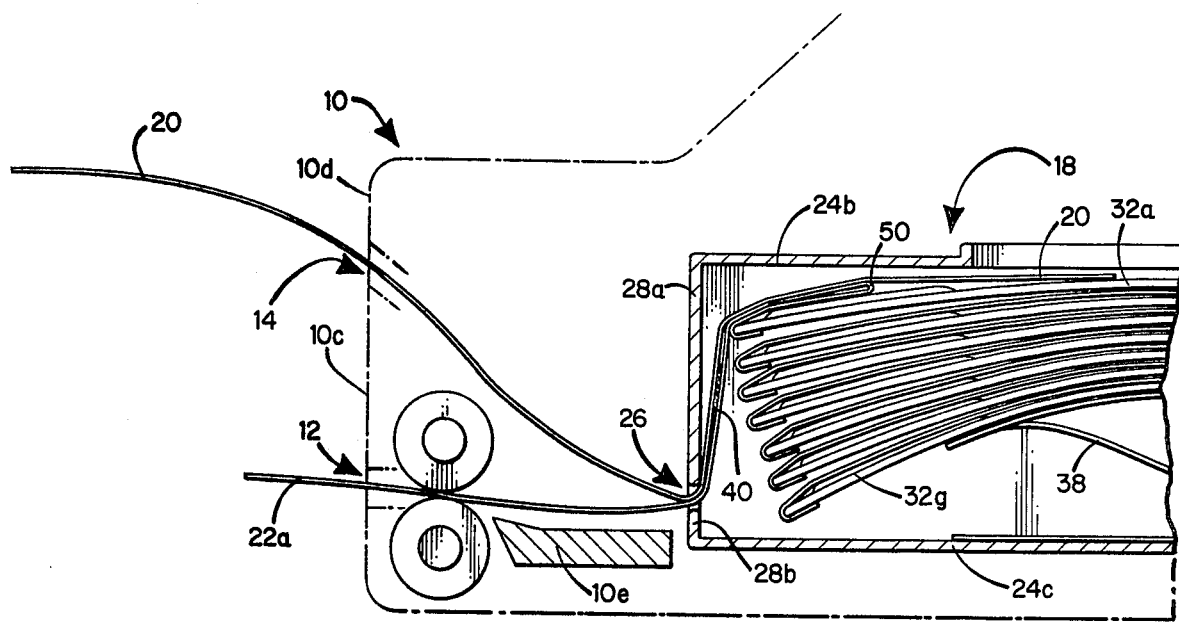
FIGS. 4 and 5 are enlarged, fragmentary views showing operation of the cassette structure of FIGS. 2 and 3 in the camera of FIG. 1.

The user prepares the cassette for use by manually withdrawing the dark slide 20 out of the camera opening 14 by tension on the removal tab 20a. As FIG. 4 shows, this motion also draws the initial leader 22a forward between the spread rolls 16. Typically the camera 10 has structure forming a guide member 10e, FIG. 4, which extends along the length of the rolls 16 and forms a ramp-like guide between the cassette slot 26 and the nip of the spread rolls, and which guides the leader end to the rolls. After the leader passes between the spread rolls, further withdrawal of the dark slide 20 threads the leader out of the camera through the opening 12.

The withdrawal of the dark slide 20 continues to draw the first leader 22a out from the cassette 18 and along the film path 30 until the attachment between these elements at location 40 passes out of the cassette. The travel of the dark slide and of the leader 22a along different paths as FIG. 4 shows is sufficient to separate the "tack" or other connection between these elements at location 40, and accordingly they separate entirely. This leaves the dark slide 20 free for complete removal from the cassette and from the camera, without further advance of the first leader 22a.

FIG. 3 shows that the first leader 22a initially overlies the foremost film unit 32a behind the exposure window 24a. The foregoing withdrawal of the dark slide 20, however, pulls the leader out, away from the front of the film unit. FIG. 4 illustrates this, for just prior to the separation of the dark slide from the first leader 22a, the "fold" of this leader has moved across the cassette to the location 50. The further withdrawal of the leader 22a, to the point where it separates from the dark slide, withdraws the leader entirely from the front of the film unit. At this juncture, the first leader 22a is in essentially the same condition as the leader 22 which FIG. 2 shows.

In this manner, the leading edge of the foremost film unit 32a is pulled at a first angle into engagement with the panel 28a whereupon the image area 21a registers with the exposure window in readiness for exposure. The user may thereafter pull the exposed film unit 32a out of the cassette by grasping the wide portion 42 of the leader 22a and pulling it so as to cause the film unit 32a to be engagingly deflected by the panel 28a to a second angle and then to advance toward the discharge slot 26 so as to be withdrawn from the cassette and through the spread rolls. It should be understood that the image areas 21 of the remaining film units may not be in registration with the exposure window when the film unit 32a is withdrawn from the cassette.

Figure 5:
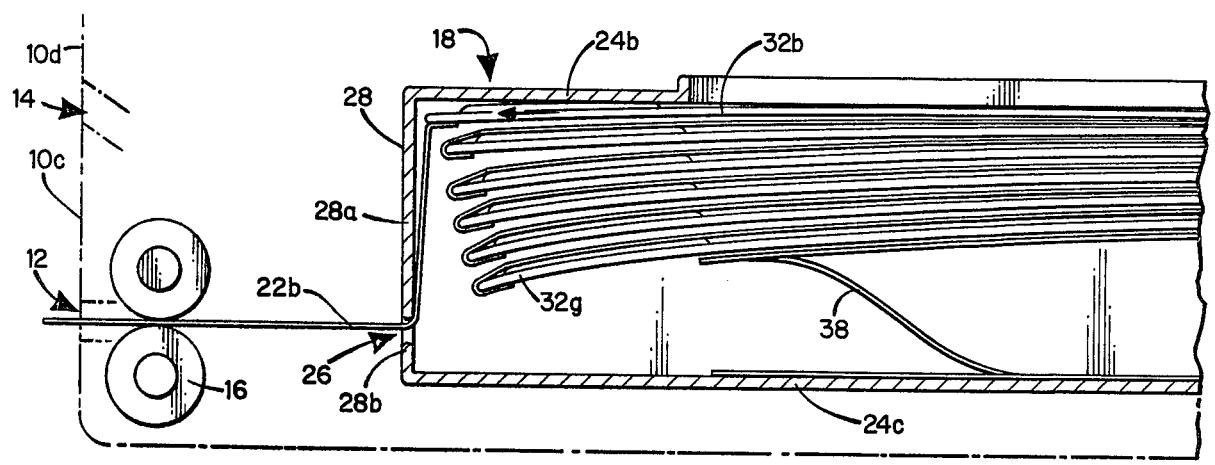

The wide portion 42 of the leader 22a and the leader attachment to the film unit 32a are sufficiently strong to remain intact under the tension required to extract the exposed film unit from the cassette after which the leading edge of the next succeeding film unit 32b is pulled at the aforementioned first angle into engagement with the panel 28a so as to bring its image area 21b into registration with the exposure window when the exposed film unit is entirely out of the camera, the neck portion 44 of the next leader 22b (FIG. 3) becomes taut upon engagement of the leading edge of film unit 32b with panel 28a as shown in FIG. 5, and severs at the perforation 46.

This separation of the leader attached to the unexposed foremost film unit 32b results from the coaction of multiple mechanisms, which FIG. 5 illustrates. One is that the spring 38 resiliently urges all the unexposed film units 32 flat against the inside of the cassette front wall 24b. Consequently, when pulled in the direction toward the cassette slot 26 by the leader 22b, the leading edge of the foremost film unit 32b tends to interferingly engage the cassette hold back panel 28a so as to effect an increase in the tension of the leader 22b thereby signifying that the image area 21b is in registration with the exposure window.

Another mechanism is the attachment of the leader 22b to the leading end of the film unit 32b, as discussed above with reference to FIG. 3, on the film unit side facing the spring 38. This location of the attachment leaves the leading edge of the film unit 32b laterally projecting behind the leader. The dragging projection of the film unit leading edge bears against the hold back panel 28a with a force that results from the combined actions of the spring 38, the pull exerted by the leader, and the stiffness of the film unit 28 against deformation from its normal planar configuration to the contour required to pass through slot 26. (In contrast, if the leader were secured to the other film unit side, i.e. which faces away from the spring 38, the leader would pass around the leading edge of the unit and guide it toward the discharge slot 26).

A further factor in the leader separation is that the leader is of such pliable material that, in the span between the rolls 16 and through the slot 26 to the film unit 32, it tends to assume a sharply angled configuration, as FIG. 5 shows. Increased tension of the leader dislodges the foremost film unit from the posture of FIG. 5 and draws it downward to the discharge slot 26, in a manner similar to that shown in FIG. 4 for dark slide removal.

However, the leader 22b, typically of other unit-to-unit leaders, is configured to be sufficiently weak to separate, e.g. break apart, when the unit 32a is pulled out of the camera sufficiently to bring the foregoing mechanisms into action, i.e. before the next film unit 32b is dislodged from its position foremost in the cassette. The separation occurs at a location on the leader between the forward end of base portion 42 secured to the film unit 32b and the preceding film unit 32a. The requisite weakening of the leader can result from any structures known in the art, including releasable attachment to the preceding film unit, a narrow and hence a weak width in the neck portion 44, or perforations 46, or a combination of such elements. The illustrated leaders employ both a narrow neck portion 44 and perforations.

In addition to the foregoing structure which ensures that the leader structure separates so that only one film unit is withdrawn from the cassette, and not a serial succession of two or more leader interconnected units, the cassette discharge slot 26 is sufficiently narrow to restrict two film units from being withdrawn simultaneously. This constraint on the width of the discharge slot 26, however, does not preclude it from being sufficiently wide to enable a single film unit to pass without breaking the pod 34.

With further reference to FIG. 2, it illustrates the cassette 18 as having film units 32 stacked in register. This film stacking places the relatively fat film pods 34 one above the other and hence limits the number of film units which the cassette can accommodate, especially after allowances are made for the spring 38, for the dark slide, and for necessary clearance. The cassette height or thickness is limited, however, for it must meet existing camera dimensions.

Figure 6:
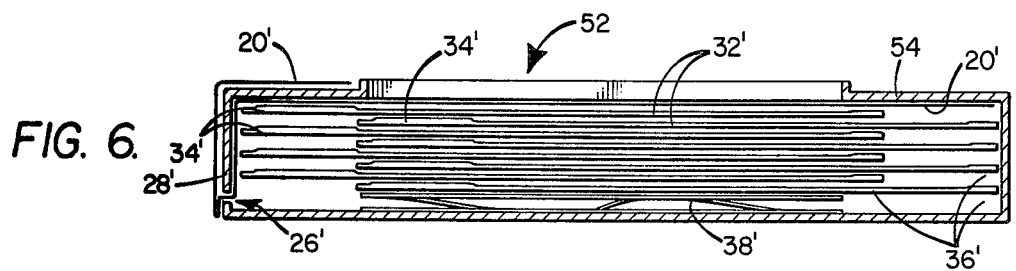
FIG. 6 is a side elevation view, partly broken away, of a film cassette having film units in staggered alignment according to the invention.
Figure 8:
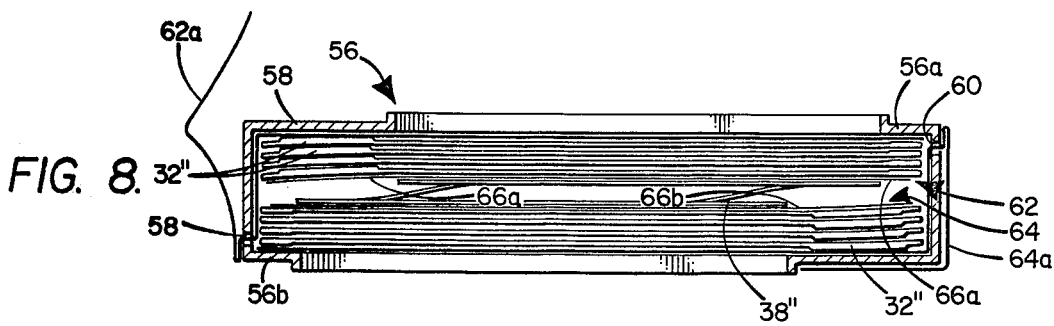
FIG. 8 is a side elevation view, partly broken away, of a film cassette having film units in registered alignment in back-to-back sets according to the invention.

The invention provides two cassettes which solve this problem, as shown in FIGS. 6 and 8. The former cassette has film units offset in a staggered alignment, and the latter cassette is reversible with two back-to-back sets of registered film units. The cassette 52 of FIG. 6 contains an assemblage of film units 32' and leaders (not shown) similar to that shown in FIG. 3, and has a dark slide 20' and a spring 38'. However, as shown, the film units are stacked in a staggered configuration such that contiguous units are laterally offset from each other by the length of the pod 34' plus whatever marginal rim the film unit has between the pod and the forward periphery. With the bulging pods thus offset from one another into two non-overlapping stacks, more film units can be packaged in a cassette of given thickness than with the registered stacking of FIG. 2. The staggered film unit stacking of FIG. 6, however, increases the horizontal or lateral dimension of the cassette by the amount of the offset. The cassette casing 54 is correspondingly longer than a single film unit, but otherwise can have dimensions comparable to those of the cassette casing 24 of FIG. 2.

FIG. 6 shows the cassette 52 as originally packaged and hence prior to insertion into a camera. In this condition, the dark slide 20' is folded to provide a labyrnth-type light shield over the cassette discharge slot 26'. The seal prevents inadvertent entry of light into the cassette by way of the slot 26' prior to the time the cassette is loaded into the camera, after which the closed camera body shields the slot from actinic radiation.

Figure 7:
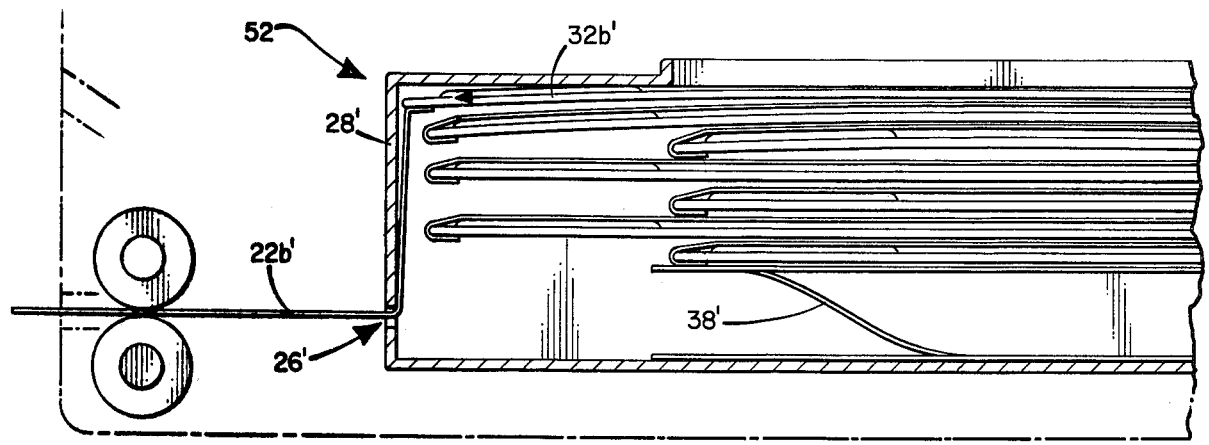
FIG. 7 is a view like FIGS. 4 and 5 showing operation with the cassette of FIG. 6.

The FIG. 6 cassette 52 of staggered film units requires that each film unit which is initially offset away from the casing wall where the discharge slot 26' is located be incremented toward that wall, i.e. moved to the left in FIG. 6, prior to exposure. However, the film units which are laterally offset to the right in FIG. 6 are automatically shifted into position, one by one, as they become uppermost or foremost in the cassette. The above-described interconnecting leader structure pulls each film unit 32' into abutting engagement with the slotted cassette wall 28' before the leader breaks. FIG. 7 illustrates this by showing that the foremost film unit in the cassette has been shifted from an original laterally-offset position fully to the left, where it is aligned for exposure.

FIG. 8 shows a reversible cassette 56, employing symmetrical back-to-back loading of film units, which houses more units than the registered alignment of FIG. 2 and which does not require the additional lateral cassette length which the staggered arrangement of FIG. 6 occupies. The cassette 56 has a first wall 56a with an exposure window facing opposite a second wall 56b having an exposure window, and has discharge slots 58 and 60 in two opposed end walls. A set 62 of leader-interconnected film units 32" with a dark slide 62a, structured in the manner disclosed above with reference to FIG. 3, is packaged between the spring 38" and the cassette wall 56a. The slide 62a and the free end of the first leader extend through the discharge slot 58. A like set 64 of leader-interconnected film units is packaged on the other side of the spring 38" beneath the cassette wall 56b, with the dark slide 64a and first leader thereof extending through the associated discharge slot 60. The film units in each set 62 and 64 are stacked in the registered alignment of FIG. 2, but the two sets are arranged with the lead ends and accordingly the pods thereof at different ends of the cassette. The spring 38" can be of the same construction as disclosed above, although other known constructions can be employed to urge each set of film units and the associated dark slide against the associated exposure window.

A further optical shield can be provided within the cassette 56 between the two sets of film units. The shield ensures that after one set of film units is consumed, light entering the cassette from the then uncovered exposure window does not reach the other set of film units. The shield can, for example, be in the form of two shield elements 66a and 66b, each interposed between one side of the spring 38" and the lowermost film unit of one set 62, 64.

The back-to-back cassette 56 thus distributes the relatively large thickness of the pods 34, taking advantage of the comparatively small thickness throughout the rest of each film unit including at the traps 36.

The symmetrically loaded cassette 56 is used by inserting it in the camera compartment 10a (FIG. 1) with either wall 56a or 56b facing the lens. One set of film units is then used in the manner described above, after which the user removes the cassette, and reinserts it into the camera with the other wall facing the lens, so that the second set of film units is available for use.

Figure 9:
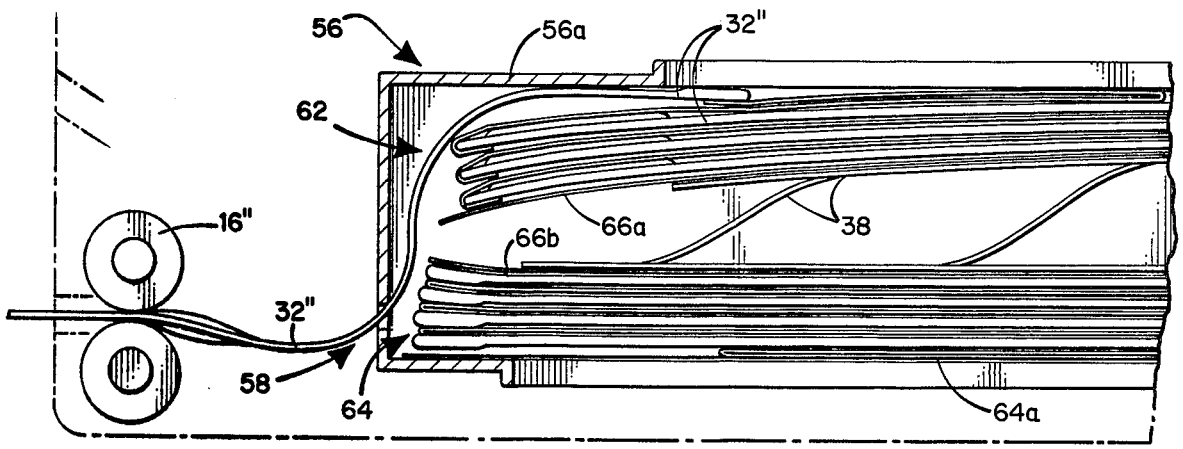
FIG. 9 illustrates operation thereof.

The back-to-back stack of self-contained film units in the cassette 56 is compact in both height and length. Further, all film units are packaged in ready alignment under the exposure window with which they are associated. As FIG. 9 shows, the space between the two sets of film units, where the spring 38" is seated, allows the set of film units being used to deflect upon withdrawal of a film unit. FIG. 9 illustrates the configuration within the cassette 56 during withdrawal of the foremost film unit 32" of the set 62, with the film unit set 64 still intact.

Figure 10:
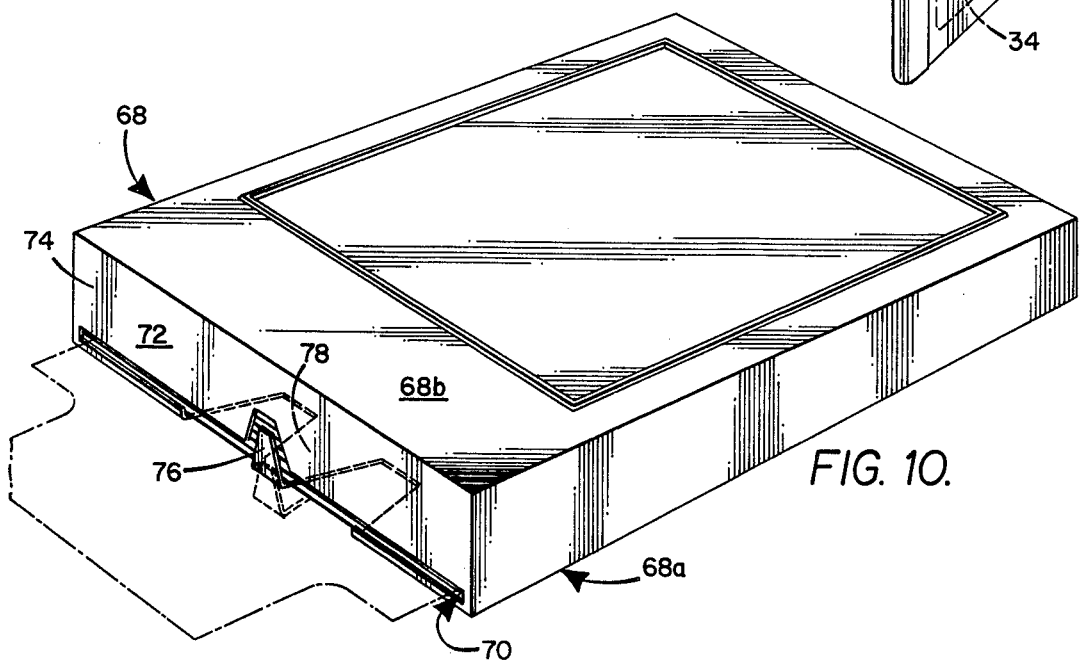
FIG. 10 is a perspective view of another film cassette embodying the invention.

FIG. 10 shows a self-contained film cassette 68 employing an alternative casing construction for practicing the invention, particularly when the casing is made of sheet metal. The cassette 68 has a discharge slot 70 and a hold back panel 72 in an end wall 74 structured analogous to the corresponding elements of the cassette in FIG. 2. However, alternative to using a hold back lip 28b as shown in FIG. 2, the cassette 68 has a tooth-like, resiliently-deflecting projection 76 extending from the casing back wall 68a toward the front wall 68b which carries the exposure window. The projection 76 extends parallel to, and preferably in the plane of, the cassette end wall 74. Moreover, the illustrated projection 76 not only protrudes into the discharge slot 70 but beyond, and the panel 72 is recessed with a clearance notch to receive the projection. The projection is preferably mounted to the cassette structure by way of an arm portion 78 of the back wall to facilitate resilient deflection of the projection from the normal position, shown solid, to a withdrawn position indicated with dashed lines. The projection resiliently deflects to the withdrawn position upon the withdrawal of a dark slide or a film unit, and by tension on the leader projecting from the cassette. The resilient urging which the projection 76 imparts to structure being withdrawn from the cassette facilitates the engagement of a film unit with the hold back panel 72 to prevent inadvertent withdrawal from the cassette.

Where desired, two or more projections can be used in lieu of the single one illustrated, and they can be located to engage lateral margins of each film unit outside the photosensitive area.

The invention thus provides a cassette of self-contained units of self-developing film which can be used in cameras designed for cassettes of peel-apart film. Film cassettes embodying the invention are structured to enable manual transport of an exposed film unit from the cassette through engagement with the camera spread rolls and out of the camera. Further, the structure limits the withdrawal to the single film unit which is foremost in the cassette; the structure effectively precludes the withdrawal of two film units simultaneously, and of two or more film units in succession. The invention attains the foregoing features with the selective combination of frangible leader structure interconnecting the film units, including the location of the attachment, and with hold back elements on the cassette casing, coupled with the selective placement of the film discharge slot relative to the planar position to which the foremost film unit is resiliently biased for exposure. One characterizing feature of the invention is that the film units as well as the interconnecting leaders follow essentially the same path and pass through the camera spread rolls, whereas the cassette dark slide is withdrawn along a different path.

It will thus be seen that the objects set forth above, among those made apparent from the preceding description are efficiently attained. Since certain changes may be made in carrying out the above method, in the described products, and in the constructions set forth without departing from the scope of the invention, it is intended that all matter contained in the above description be interpreted as illustrative and not in a limiting sense.

It is also to be understood that the following claims cover all generic and specific features of the invention here described, and all statements of the scope of the invention which, as a matter of language, might be said to fall therebetween.

Having described the invention, what is claimed as new and secured by Letters Patent is:

1. A self-developing photographic film cassette comprising:

a plurality of self-developing photographic film units each having an image area of given length intermediate a leading and trailing edge and arranged in sequential stacked relation from first forwardmost to last with respect to each other;

leader means for at least interconnecting the trailing edge of each film unit to the leading edge of the immediately succeeding film unit in said stack;

housing means for holding said stacked film units, said housing means having a forward generally planar wall member adjacent said forwardmost film unit with an exposure window therethrough of substantially the same length as said given length, said housing means additionally including wall means defining an elongated film discharge slot in generally parallel spaced apart relation with respect to the leading edge of the forwardmost of said film units, said wall means including a backward generally planar wall member spaced apart from said forward wall member in generally parallel relation thereto with said stack of film units being disposed between said forward and backward walls, said wall means additionally including peripheral side walls interconnecting said forward and backward walls with that one of said sidewalls most closely spaced from said leading edges of said film units defining said discharge slot, said discharge slot also being more closely spaced to said backward wall member than said forward wall member;

removable light shield means for shielding the forwardmost of said film units from actinic radiation attempting to enter said cassette through its said exposure window;

resilient means for yieldably urging said stacked film units toward said exposure window to move each successive film unit in order of first to last into the forwardmost position adjacent said exposure window upon the withdrawal of each preceding film unit through said discharge slot; and means for facilitating the withdrawal of said first forwardmost film unit from said discharge slot in said housing means, said wall means being configured to engage the leading edge of each successive film unit in the forwardmost position just as said image area of that film unit is pulled into registration with said exposure window by that portion of said leader means connected directly to the leading edge thereof, with further pulling of said respective leader portion increasing the tension thereof and causing the leading edge of the pulled film unit to assume deflecting engagement with said wall means to effect the advancement of the pulled film unit towards and through said discharge slot, each of said successive engagements between said wall means and a respective film unit, in order of second to last, serving to substantially increase the tension at that portion of the leader means being pulled so as to signify that the next succeeding film unit is in the forwardmost position with its image area in registration with said exposure window.

2. The film cassette of claim 1 wherein said discharge slot defining wall member is substantially perpendicular with respect to said forward wall member, said discharge slot defining wall member operating to engage the leading edge of each successive film unit in the forwardmost position at a first select angle just as said image area of that film unit is pulled into registration with said exposure window by that portion of said leader means connected directly to the leading edge thereof, said increased tension in said portion of said leader means thereafter operating to cause said film unit to deflect to a second angle with respect to said discharge slot defining wall member and then to advance toward said discharge slot so as to be withdrawn from said housing means with all of said image areas of said remaining film units remaining out of registration with said exposure window when said forwardmost film unit passes through said slot.

3. The film cassette of claim 1 wherein said leader means includes portions interconnecting said trailing edge of each film unit with the leading edge of the immediately succeeding unit in the stack thereof, each leader portion which interconnects successive film units having a frangible link between the preceeding film unit and a base portion of the leader means which is attached to the underlying surface of the next successive film unit, said frangible link being configured to break apart upon the application thereto of said increased tension thereby signifying that the next succeeding film unit is in the forwardmost position in registration with said exposure window, said base portion of the leader means extending outward of said discharge slot subsequent to the breaking apart of said frangible link so as to accommodate the further pulling thereof to withdraw that film unit presently in the forwardmost position.

4. The film cassette of claim 1 wherein said removable light shield means includes: a dark slide interposed between said forward wall member and said film units, and a withdrawal tab projecting out said discharge slot to accommodate the pulling of said dark slide through said discharge slot.

5. The film cassette of claim 4 wherein said means for facilitating the withdrawal of said first film unit from said discharge slot in said housing means includes connecting means for providing a releasable connection between said dark slide and first film unit, said releasable connection being configured to break apart upon the application thereto of said increased tension sufficient to deflect said first film unit about said wall means subsequent to said leading edge of said first film unit engaging said wall means.

6. The film cassette of claim 5 wherein said releasable connecting means includes a portion thereof extending from its connection to said dark slide to a free end thereof disposed outside said housing means.

7. The film cassette of claim 1 wherein said resilient means includes a spring interposed between said backward wall member and the last of said stacked film units so as to resiliently urge said stacked film units toward said forward wall member.

8. The film cassette of claim 1 wherein the portion of said sidewall which defines said discharge slot between said backward wall member and said discharge slot forms a film unit blocking lip.

9. The film cassette of claim 1 wherein: each film unit has a rupturable container of photoprocessing composition closely spaced to the leading edge thereof, and said film units are stacked in a staggered arrangement with a first set of stacked film units and a second set of stacked units interleaved with the units of said first set with the leading edges thereof laterally offset from the leading edges of said first set by a distance that at least removes adjacent rupturable containers from lying one above the other.

10. The film cassette of claim 1 including another plurality of self-developing photographic film units each having an image area of given length intermediate a leading and trailing edge and arranged in sequential stacked relation from first forwardmost to last with respect to each other and including another leader means for at least interconnecting the trailing edge of each other film unit to the leading edge of the immediately succeeding other film unit in said other stack; wherein said backward wall member is adjacent the forwardmost of said other film units and includes another exposure window therethrough of substantially the same length as said given length of said other image areas wherein another of said sidewalls spaced opposite from and generally parallel to said sidewall which defines said discharge slot defines another elongated film discharge slot in generally parallel spaced apart relation with respect to the leading edge of the forwardmost of said other film units; wherein said film cassette additionally includes another removable light shield means for shielding the forwardmost of said other film units from actinic radiation attempting to enter said cassette through its said other exposure window: wherein said resilient means additionally operate to urge said other stacked film units toward said other exposure window in order to move each successive other film unit in order of first to last into the forwardmost position adjacent said other exposure window upon the withdrawal of each preceding other film unit through said other discharge slot; wherein said film cassette includes other means for facilitating the withdrawal of said first other film unit from said other discharge slot in said housing means; wherein said other sidewall is configured to engage the leading edge of each successive other film unit in the forwardmost position just as said image area of that other film unit is pulled into registration with said other exposure window by that portion of said other leader means connected directly to the leading edge thereof, with further pulling of said respective other leader portion increasing the tension thereof and causing the leading edge of the other film unit to assume deflecting engagement with said other side wall to effect the advancement of the other pulled film unit towards and through said other discharge slot, each of said successive engagements between said other sidewall and a respective other film unit, in order of second to last, serving to substantially increase the tension at the portion of the other leader means being pulled so as to signify that the next succeeding other film unit is in the forwardmost position with its image area in registration with said other exposure window.

11. The film cassette of claim 10 wherein said resilient means includes a compression spring interposed between said two film stacks so as to resiliently urge each of said film stacks in opposing directions toward a respective exposure window.

12. The film cassette of claim 10 including optical shield means interposed between said sets of film units for blocking actinic radiation from passing from either exposure window to the film units associated with the other exposure window.

* * * * *